(12) United States Patent
Feng

(10) Patent No.: US 11,846,991 B2
(45) Date of Patent: Dec. 19, 2023

(54) FOLDABLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 587 days.

(21) Appl. No.: 16/979,997

(22) PCT Filed: Jun. 23, 2020

(86) PCT No.: PCT/CN2020/097610
§ 371 (c)(1),
(2) Date: Sep. 11, 2020

(87) PCT Pub. No.: WO2021/253467
PCT Pub. Date: Dec. 23, 2021

(65) Prior Publication Data
US 2023/0100341 A1    Mar. 30, 2023

(30) Foreign Application Priority Data
Jun. 15, 2020   (CN) .......................... 202010539953.0

(51) Int. Cl.
*G06F 1/16*        (2006.01)

(52) U.S. Cl.
CPC .......... *G06F 1/1652* (2013.01); *G06F 1/1616* (2013.01); *G06F 1/1624* (2013.01); *G06F 1/1641* (2013.01); *G06F 1/1681* (2013.01)

(58) Field of Classification Search
CPC .... G06F 1/1616; G06F 1/1624; G06F 1/1637; G06F 1/1641; G06F 1/1652; G06F 1/1681
See application file for complete search history.

(56) References Cited

U.S. PATENT DOCUMENTS

| 9,204,565 B1 | 12/2015 | Lee et al. |
| 9,348,450 B1 | 5/2016 | Kim |
| 10,520,989 B1 * | 12/2019 | Hsu ........................ G06F 1/1616 |

(Continued)

FOREIGN PATENT DOCUMENTS

| CN | 106205384 A | 12/2016 |
| CN | 107644590 A | 1/2018 |

(Continued)

*Primary Examiner* — Abhishek M Rathod

(57) ABSTRACT

The present application provides a foldable display device, including a housing, a connecting member, a first support plate, a second support plate, and a flexible display panel. There is a rotational connection between the housing and the connecting member, between the first support plate and the connecting member, and between the second support plate and the housing. There is a sliding connection between the first support plate and the second support plate. During a bending process of the foldable display device, the first support plate slides relative to the second support plate.

20 Claims, 3 Drawing Sheets

(56) References Cited

U.S. PATENT DOCUMENTS

| | | | |
|---|---|---|---|
| 11,073,863 B2* | 7/2021 | Kim | G06F 1/1656 |
| 11,106,239 B2* | 8/2021 | Yoon | G06F 1/1652 |
| 11,256,293 B2* | 2/2022 | Lee | G06F 1/1681 |
| 11,474,567 B2* | 10/2022 | Chen | E05D 3/122 |
| 2016/0378203 A1 | 12/2016 | Kim | |
| 2019/0132974 A1 | 5/2019 | Chen | |
| 2019/0200470 A1 | 6/2019 | Woo | |
| 2019/0369671 A1 | 12/2019 | Seo et al. | |
| 2020/0162598 A1* | 5/2020 | Si | H04M 1/022 |
| 2020/0293094 A1* | 9/2020 | Liu | G06F 1/1681 |
| 2020/0341523 A1 | 10/2020 | Chen | |
| 2021/0067614 A1* | 3/2021 | Cheng | G06F 1/1681 |
| 2021/0307185 A1* | 9/2021 | Hong | H05K 5/0226 |
| 2021/0307186 A1* | 9/2021 | Hong | G06F 9/30 |
| 2021/0325941 A1* | 10/2021 | Hou | G06F 1/1681 |

FOREIGN PATENT DOCUMENTS

| | | |
|---|---|---|
| CN | 207543155 U | 6/2018 |
| CN | 108520701 A | 9/2018 |
| CN | 108646858 A | 10/2018 |
| CN | 110767091 A | 2/2020 |
| CN | 111105712 A | 5/2020 |
| WO | 2020032729 A1 | 2/2020 |

* cited by examiner

FOLDABLE DISPLAY DEVICE

FIELD OF INVENTION

The present application is related to the field of display technology, and specifically, to a foldable display device.

BACKGROUND OF INVENTION

With development of display device manufacturing technology, users increasingly pursue a diversity of display devices. Among them, foldable display devices are widely favored by users and manufacturers due to its characteristics of sense of technology, fashion, and convenience.

One application of organic light-emitting diode (OLED) display panels to the foldable display devices has become an industry consensus, as such applications perfectly utilize flexible and bendable characteristics of the OLED display panels. Currently, folding methods of the foldable display devices equipped with flexible OLEDs is folding inward or folding outward. In an inward-folding display device, after the display device is bent, a size of an inner surface of a support structure supporting a flexible display screen is reduced, resulting in a size mismatch between the inner surface of the support structure and the flexible display screen. During a bending process, the support structure squeezes a bending region of the flexible display screen, which may easily lead to failure or even damage the flexible display screen.

Thus, during the bending process of the inward-folding display device in the prior art, the support structure supporting the flexible display screen easily squeezes the flexible display screen, which may easily lead to the failure or even the damage the flexible display screen.

SUMMARY OF INVENTION

In order to solve the above technical problem, solutions provided by the present application are as follows.

The present application provides a foldable display device including:

a housing including a left housing and a right housing disposed opposite to each other;

a connecting member disposed between the left housing and the right housing, wherein the connecting member is rotationally connected to an end of the left housing and an end of the right housing;

a first support plate including a left first support plate and a right first support plate, wherein the connecting member is rotationally connected to an end of the left first support plate and an end of the right first support plate;

a second support plate including a left second support plate and a right second support plate, wherein an end of the left second support plate is rotationally connected to the left housing, another end of the left second support plate is slidingly connected to the left first support plate, an end of the right second support plate is rotationally connected to the right housing, and another end of the right second support plate is slidingly connected to the right first support plate; and a flexible display panel disposed on a surface formed by a connection of the housing, the connecting member, the first support plate, and the second support plate, wherein the flexible display panel includes two first regions and a bendable region connected to the two first regions, the bendable region is separately disposed on a surface formed by a connection of the connecting member, the first support plate, and the second support plate, and the first regions are attached to the housing.

In the foldable display device of the present application, a surface of the connecting member near the flexible display panel is a flat surface. The flat surface of the connecting member is configured to support the flexible display panel.

In the foldable display device of the present application, a surface of the connecting member away from the flexible display panel is an arc-shaped surface.

In the foldable display device of the present application, connection points of the left housing and the right housing with the connecting member are located in a middle region of a side surface of the connecting member.

In the foldable display device of the present application, connection points of the left first support plate and the right first support plate with the connecting member are located at two opposite ends of the side surface of the connecting member.

In the foldable display device of the present application, a connection type between the housing and the connecting member is a shaft/hole connection.

In the foldable display device of the present application, at a connection point of the housing and the connecting member, the housing is provided with a shaft, the connecting member is provided with a corresponding hole, and the shaft of the housing is mounted in the hole of the connecting member.

In the foldable display device of the present application, at a connection point of the housing and the connecting member, the housing is provided with a hole, the connecting member is provided with a corresponding shaft, and the shaft of the connecting member is mounted in the hole of the housing.

In the foldable display device of the present application, a connection type between the first support plate and the connecting member is a shaft/hole connection.

In the foldable display device of the present application, at a connection point of the first support plate and the connecting member, the first support plate is provided with a shaft, the connecting member is provided with a corresponding hole, and the shaft of the first support plate is mounted in the hole of the connecting member.

In the foldable display device of the present application, at a connection point of the first support plate and the connecting member, the first support plate is provided with a hole, the connecting member is provided with a corresponding shaft, and the shaft of the connecting member is mounted in the hole of the first support plate.

In the foldable display device of the present application, a connection type between the second support plate and the housing is a shaft/hole connection.

In the foldable display device of the present application, at a connection point of the second support plate and the housing, the second support plate is provided with a shaft, the housing is provided with a corresponding hole, and the shaft of the second support plate is mounted in the hole of the housing.

In the foldable display device of the present application, at a connection point of the second support plate and the housing, the second support plate is provided with a hole, the housing is provided with a corresponding shaft, and the shaft of the housing is mounted in the hole of the second support plate.

In the foldable display device of the present application, the first support plate is provided with a hook structure. The second support plate is mounted to the hook structure of the first support plate. The first support plate is slidingly connected to the second support plate.

In the foldable display device of the present application, the second support plate is provided with a hook structure. The first support plate is mounted to the hook structure of the second support plate. The first support plate is slidingly connected to the second support plate.

In the foldable display device of the present application, when the foldable display device is in a fully-expanded state, the housing, the connecting member, the first support plate, and the second support plate form a flat surface to support the flexible display panel, and a side of the connecting member away from the flexible display panel is located in the housing.

In the foldable display device of the present application, when the foldable display device is in a fully-folded state, the connecting member, the first support plate, and the second support plate form a triangular accommodating region, and the bendable region of the flexible display panel is located in the triangular accommodating region.

In the foldable display device of the present application, the bendable region of the flexible display panel is a flexible region.

The present application provides a foldable display device including:

a housing including a left housing and a right housing disposed opposite to each other;

a connecting member disposed between the left housing and the right housing, wherein the connecting member is rotationally connected to an end of the left housing and an end of the right housing through a shaft and a hole;

a first support plate including a left first support plate and a right first support plate, wherein the connecting member is rotationally connected to an end of the left first support plate and an end of the right first support plate through a shaft and a hole;

a second support plate including a left second support plate and a right second support plate, wherein an end of the left second support plate is rotationally connected to the left housing through a shaft and a hole, another end of the left second support plate is slidingly connected to the left first support plate, an end of the right second support plate is rotationally connected to the right housing through a shaft and a hole, and another end of the right second support plate is slidingly connected to the right first support plate; and a flexible display panel disposed on a surface formed by a connection of the housing, the connecting member, the first support plate, and the second support plate, wherein the flexible display panel includes two first regions and a bendable region connected to the two first regions, the bendable region is separately disposed on a surface formed by a connection of the connecting member, the first support plate, and the second support plate, and the first regions are attached to the housing.

The foldable display device provided by the present application includes a plurality of rotational connection components and sliding connection components. The sliding connection components are sliding connections between the first support plate and the second support plate. During a bending process of the foldable display device, the first support plate and the second support plate slide relative to each other, so that a size of an inner surface of the flexible display device matches a size of the flexible display panel, which prevents the flexible display panel from being squeezed and optimizes foldable performance of the foldable display device.

DESCRIPTION OF DRAWINGS

In order to describe technical solutions in the present application clearly, drawings to be used in the description of embodiments will be described briefly below. Obviously, drawings described below are only for some embodiments of the present application, and other drawings can be obtained by those skilled in the art based on these drawings without creative efforts.

DETAILED DESCRIPTION OF PREFERRED EMBODIMENTS

Figure 1:
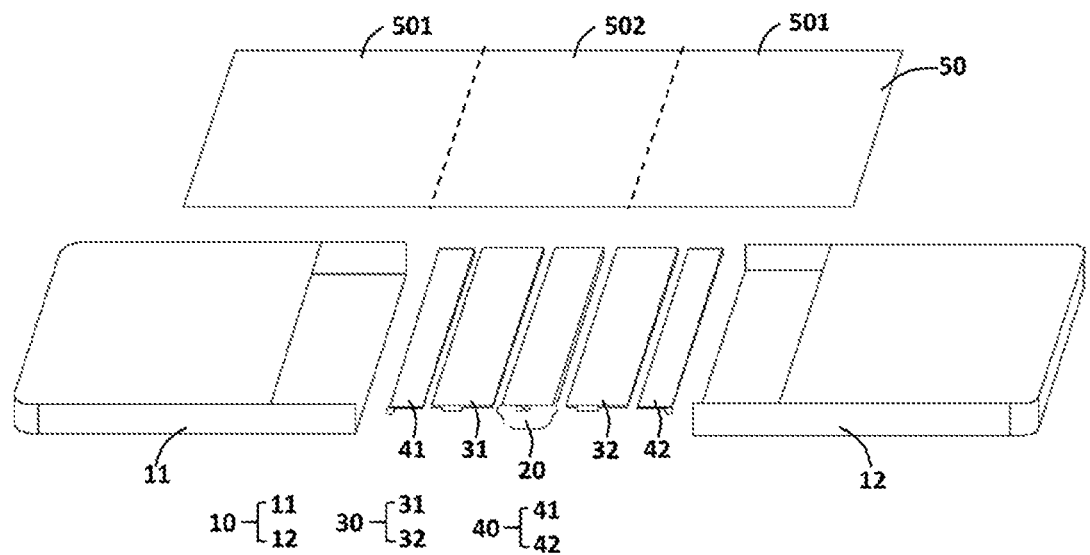
FIG. 1 is an exploded view of a structure of a foldable display device provided by an embodiment of the present application.

Examples are described below with reference to the appended drawings, and the drawings illustrate particular embodiments in which the present application may be practiced. Directional terms mentioned in the present application, such as upper, lower, front, rear, left, right, in, out, side, etc., only refer to directions in the accompanying drawings. Thus, the adoption of directional terms is used to describe and understand the present application, but not to limit the present application. In the drawings, units of similar structures are using the same numeral to represent.

An embodiment of the present application provides a foldable display device, including a plurality of rotational connection components and sliding connection components. The sliding connection components are sliding connections between a first support plate and a second support plate. During a bending process of the foldable display device provided by an embodiment of the present application, the first support plate and the second support plate slide relative to each other, so that a size of an inner surface of the flexible display device matches a size of a flexible display panel, which prevents the flexible display panel from being squeezed and optimizes foldable performance of the foldable display device.

Figure 2:
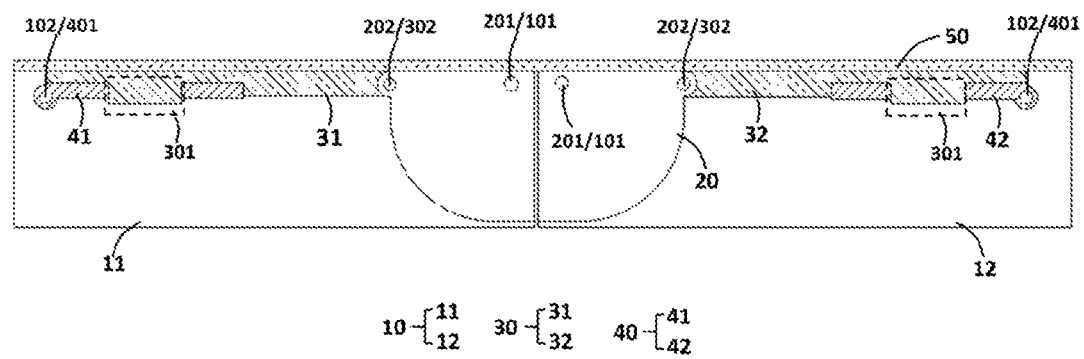
FIG. 2 is a schematic structural diagram of the foldable display device provided by an embodiment of the present application in a fully-expanded state.

As shown in FIGS. 1 and 2, FIG. 1 is an exploded view of a structure of a foldable display device provided by an embodiment of the present application, and FIG. 2 is a schematic structural diagram of the foldable display device provided by an embodiment of the present application in a fully-expanded state. The foldable display device includes a housing 10, a connecting member 20, the first support plate 30, the second support plate 40, and the flexible display panel 50. It should be explained that the foldable display device can be a display device such as a mobile phone and a tablet, accordingly, the foldable display device can further include a power supply unit, a signal/data processing unit, a picture shooting unit, etc.

The housing 10 includes a left housing 11 and a right housing 12 disposed opposite to each other. The left housing 11 and the right housing 12 are separated from each other and are connected to the connecting member 20 to form a whole body. It should be explained that the housing 10 is a support member for each element of the foldable display device. The flexible display panel 50 is disposed on a side surface of the housing 10. The side surface of the housing 10 is provided with a space and a structure for accommodating and fixing the flexible display panel 50. The connecting member 20, the first support plate 30, and the second support plate 40 are disposed in an accommodating chamber in the housing 10. The connecting member 20, the first support plate 30, the second support plate 40, and the housing 10 are rotationally connected or slidingly connected to each other to form a whole body. The left housing 11 and the right housing 12 complete relative rotation under a cooperation of the connecting member 20, the first support plate 30, and the second support plate 40, thereby achieving bendability of the foldable display device.

The connecting member 20 is disposed between the left housing 11 and the right housing 12. The connecting member 20 is rotationally connected to an end of the left housing 11 and an end of the right housing 12. Thus, the left housing 11 is connected to the right housing 12 as a whole body, and the left housing 11 and the right housing 12 can rotate around the connecting member 20 respectively.

The first support plate 30 includes a left first support plate 31 and a right first support plate 32. An end of the left first support plate 31 is rotationally connected to the connecting member 20. An end of the right first support plate 32 is rotationally connected to the connecting member 20. Thus, the left first support plate 31 and the right first support plate 32 can rotate around the connecting member 20 respectively.

The second support plate 40 includes a left second support plate 41 and a right second support plate 42. An end of the left second support plate 41 is rotationally connected to the left housing 11, and another end of the left second support plate 41 is slidingly connected to the left first support plate 31. Thus, the left second support plate 41 can rotate relative to the left housing 11 and can slide relative to the left first support plate 31. An end of the right second support plate 42 is rotationally connected to the right housing 12, and another end of the right second support plate 42 is slidingly connected to the right first support plate 32. Thus, the right second support plate 42 can rotate relative to the right housing 12 and can slide relative to the right first support plate 32. It should be explained that the relative sliding of the left second support plate 41 and the left first support plate 31 means that the left second support plate 41 and the left first support plate 31 move relative to each other on a same plane or a plane parallel to each other, and further means that the left second support plate 41 can be moved away from or close to the connecting member 20. Similarly, the relative sliding of the right second support plate 42 and the right first support plate 32 means that the right second support plate 42 and the right first support plate 32 move relative to each other on a same plane or a plane parallel to each other, and further means that the right second support plate 42 can be moved away from or close to the connecting member 20.

The flexible display panel 50 is disposed on a surface formed by a connection of the housing 10, the connecting member 20, the first support plate 30, and the second support plate 40. The flexible display panel 50 includes two first regions 501 and a bendable region 502 connected to the two first regions 501. The bendable region 502 is separately disposed on a surface formed by a connection of the connecting member 20, the first support plate 30, and the second support plate 40. The first regions 501 are attached to the housing 10. It should be explained that the flexible display panel 50 can be a full-flexible display panel that the first region 501 and the bendable region 502 can be bent, or can be a partial-flexible display panel that only the bendable region 502 can be bent. It should be understood that during the bending process of the foldable display device, the first region 501 and the housing 10 are fitted and fixed without relative displacement, and the second region 502 is then bent and relatively displaced with the connecting member 20, the first support plate 30, and the second support plate 40.

According to an embodiment of the present application, a surface of the connecting member 20 near the flexible display panel 50 is a flat surface. When the foldable display device is in the expanded state or the folded state, the flat surface of the connecting member 20 always supports the flexible display panel 50, thereby preventing the flexible display panel 50 corresponding to the connecting member 20 from being depressed, which affects appearance and performance.

Furthermore, a surface of the connecting member 20 away from the flexible display panel 50 is an arc-shaped surface, which ensures that when the left casing 11 and the right casing 12 rotate relative to the connecting member 20, they do not collide with the connecting member 20, and reserve a rotating space for the housing 10.

According to an embodiment of the present application, connection points of the left housing 11 and the right housing 12 with the connecting member 20 are located in a middle region of a side surface of the connecting member 20. The connection point of the left housing 11 and the connecting member 20 and the connection point of the right housing 12 and the connecting member 20 are arranged side by side. Optionally, the connection points between the left housing 11 and the right housing 12 with the connecting member 20 are close to the flexible display panel 50. It should be understood that the above configuration can ensure that the left housing 11 and the right housing 12 are completely aligned when the foldable display device is in the folded state.

Furthermore, connection points of the left first support plate 31 and the right first support plate 32 with the connecting member 20 are located at two opposite ends of the side surface of the connecting member 20. Optionally, the connection points are close to the flexible display panel 50. It should be understood that the above position features of the first support plate 30 can ensure that the foldable display device always maintains an accommodating space for the flexible display panel 50 during the bending process, thereby preventing the flexible display panel from overbending and squeezing.

According to an embodiment of the present application, a connection type between the housing 10 and the connecting member 20 is a shaft/hole connection, which realizes a characteristic that the housing 10 can rotate around the connecting member 20.

Furthermore, at a connection point of the housing 10 and the connecting member 20, the housing 10 is provided with a shaft 101, the connecting member 20 is provided with a corresponding hole 201, and the shaft 101 of the housing 10 is mounted in the hole 201 of the connecting member 20. Optionally, the housing 10 is provided with a hole 101, the connecting member 20 is provided with a corresponding shaft 201, and the shaft 201 of the connecting member 20 is mounted in the hole 101 of the housing 10. It should be explained that the above simple shaft/hole connection can realize a characteristic that the housing 10 rotates around the connecting member 20, but the present application is not limited to this configuration.

According to an embodiment of the present application, a connection type between the first support plate 30 and the connecting member 20 is the shaft/hole connection, which realizes a characteristic that the first support plate 30 can rotate around the connecting member 20.

Furthermore, at a connection point of the first support plate 30 and the connecting member 20, the first support plate 30 is provided with a shaft 302, the connecting member 20 is provided with a corresponding hole 202, and the shaft 302 of the first support plate 30 is mounted in the hole 202 of the connecting member 20. Optionally, the first support plate 30 is provided with a hole 302, the connecting member 20 is provided with a corresponding shaft 202, and the shaft 202 of the connecting member 20 is mounted in the hole 302 of the first support plate 30. It should be explained that the above simple shaft/hole connection can realize a characteristic that the first support plate 30 rotates around the connecting member 20, but the present application is not limited to this configuration.

According to an embodiment of the present application, a connection type between the second support plate 40 and the housing 10 is the shaft/hole connection. Optionally, a connection position of the left second support plate 41 and the left housing 11 corresponds to a middle region of a side of the left housing 11; and a connection position between the right second support plate 42 and the right housing 12 corresponds to a middle region of a side of the right housing 12.

Furthermore, at a connection point of the second support plate 40 and the housing 10, the second support plate 40 is provided with a shaft 401, the housing 10 is provided with a corresponding hole 102, and the shaft 401 of the second support plate 40 is mounted in the hole 102 of the housing 10. Optionally, the second support plate 40 is provided with a hole 401, the housing 10 is provided with a corresponding shaft 102, and the shaft 102 of the housing 10 is mounted in the hole 401 of the second support plate 40. It should be explained that the above simple shaft/hole connection can realize a characteristic that the second support plate 40 rotates relative to the housing 10, but the present application is not limited to this configuration.

Figure 3:
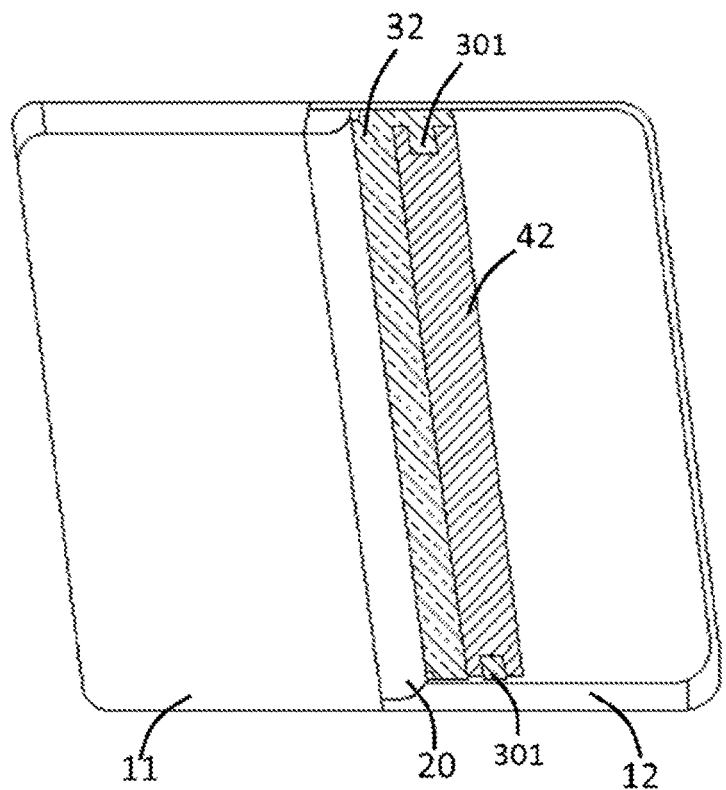
FIG. 3 is a three-dimensional view of a schematic structural diagram of the foldable display device provided by an embodiment of the present application.

According to an embodiment of the present application, as shown in FIGS. 2 and 3, the first support plate 30 is provided with a hook structure 301, and the second support plate 40 is mounted to the hook structure 301 of the first support plate 30, thereby achieving a sliding connection between the first support plate 30 and the second support plate 40. It should be understood that during the bending process of the foldable display device, the second support plate 40 slides horizontally relative to the first support plate 30, so that the size of the inner surface of the flexible display device matches the size of a flexible display panel 50, which prevents the flexible display panel 50 from being squeezed. In addition, in an actual implement, in order to realize a purpose that the second support plate 40 can slide relative to the first support plate 30, and a hook structure can be provided on the second support plate 40. The first support plate 30 is mounted to the hook structure of the second support plate 40, which realizes the sliding connection between the first support plate 30 and the second support plate 40. Besides, there can be other structural designs between the first support plate 30 and the second support plate 40 that are sufficient to keep the two relatively sliding. The above purposes are to realize that when the foldable display device is bent, the first support plate 30 and the second support plate 40 can be slidingly adjusted according to degree of bending to extend a range of extended regions of the two.

Figure 4:
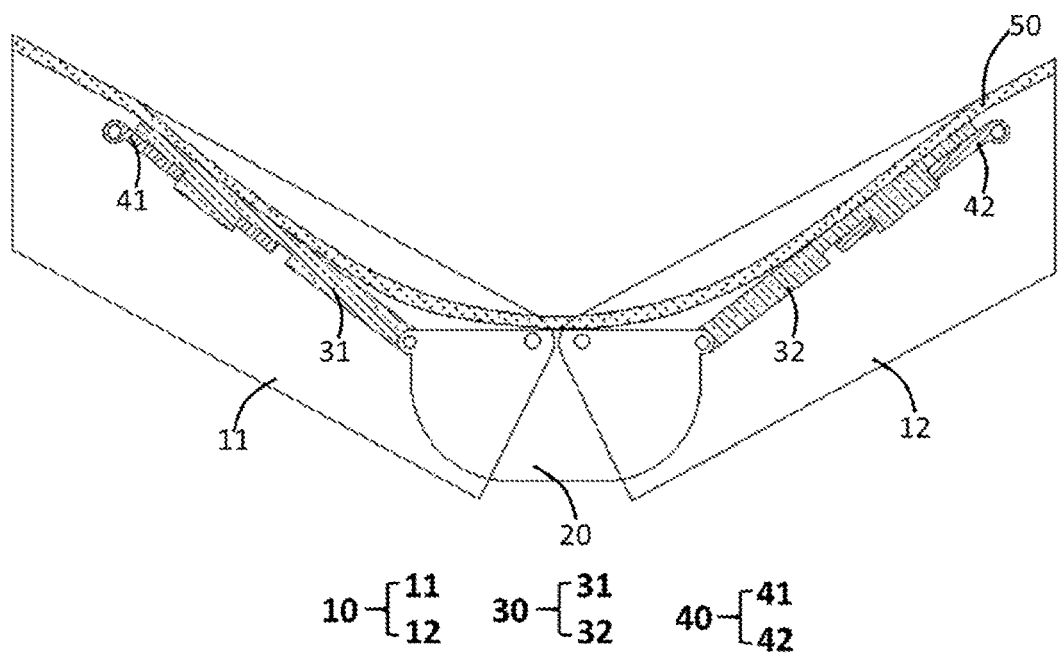
FIG. 4 is a schematic structural diagram of the foldable display device provided by an embodiment of the present application during a bending process.

As shown in FIGS. 2 and 4, it should be explained that during the bending process of the foldable display device, the inner surface of the foldable display device is compressed, and the flexible display panel 50 disposed in the foldable display device does not have telescopic performance, so the flexible display panel 50 is easily squeezed by the housing 10 to cause damage and failure. In the present application, during the bending process of the foldable display device, the first support plate 30 and the second support plate 40 slide relatively, so as to compensate for a shrinkage in size of the inner surface of the foldable display device and eliminate a pressing effect of the housing 10 on the flexible display panel 50.

Figure 5:
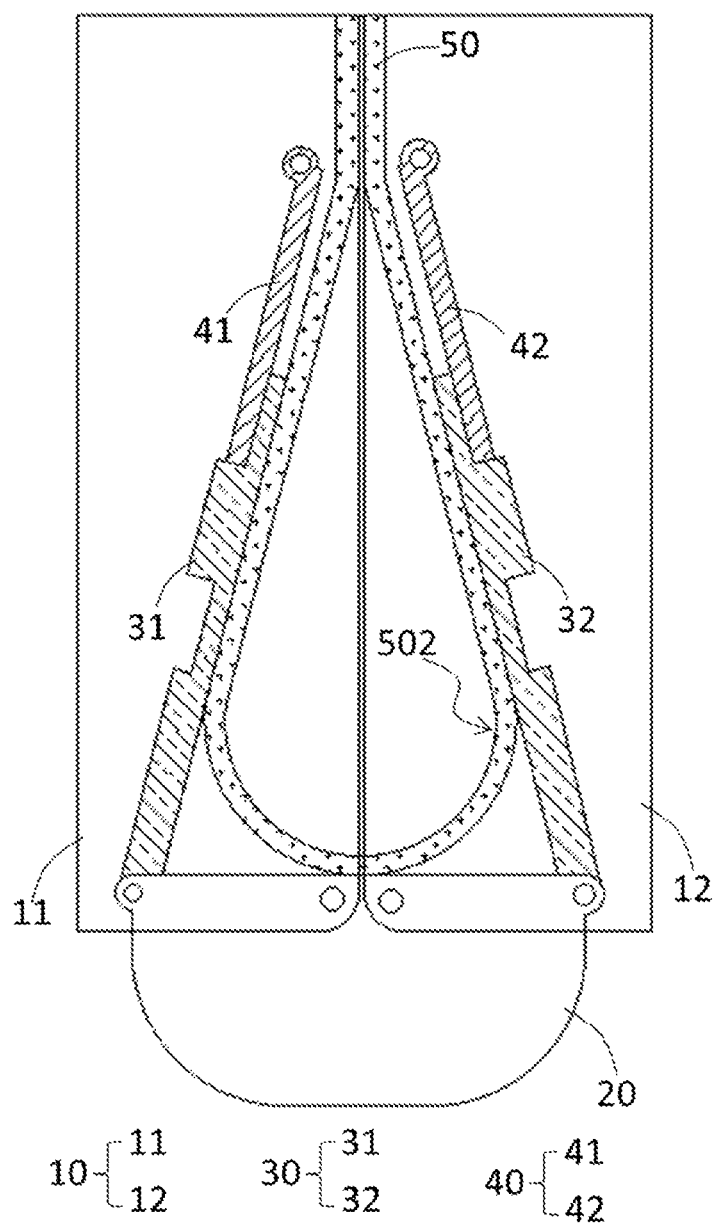
FIG. 5 is a schematic structural diagram of the foldable display device provided by an embodiment of the present application in a fully-folded state.

According to an embodiment of the present application, as shown in FIGS. 2 and 5, when the foldable display device is in the fully-expanded state (the state shown in FIG. 2), the housing 10, the connecting member 20, the first support plate 30, and the second support plate 40 form a flat surface to support the flexible display panel 50, and a side of the connecting member 20 away from the flexible display panel 50 is located in the housing. At this time, the foldable display device has a largest display area, and the housing 10, the connecting member 20, the first support plate 30, and the second support plate 40 provide complete support surface for the flexible display panel 50, preventing the flexible display panel from being depressed under influence of gravity or pressing force.

When the foldable display device is in a fully-folded state (the state shown in FIG. 5), the connecting member 20, the first support plate 30, and the second support plate 40 form a triangular accommodating region, and the bendable region 502 of the flexible display panel 50 becomes a droplet-shaped structure and is located in the triangular accommodating region. It should be understood that during a process from the fully-expanded state to the fully-folded state of the foldable display device, a sliding distance of the second support plate 40 relative to the first support plate 30 increases continuously to adapt to a change in the size of the inner surface of the foldable display device during the bending process.

In summary, the foldable display device provided by the present application includes a plurality of rotational connection components and sliding connection components. The sliding connection components are sliding connections between the first support plate and the second support plate. During a bending process of the foldable display device, the first support plate and the second support plate slide relative to each other, so that the size of the inner surface of the flexible display device matches the size of the flexible display panel, which prevents the flexible display panel from being squeezed and optimizes foldable performance of the foldable display device.

Although the present application has been disclosed above with the preferred embodiments, it is not intended to limit the present application. Persons having ordinary skill in this technical field can still make various alterations and modifications without departing from the scope and spirit of this application. Therefore, the scope of the present application should be defined and protected by the following claims and their equivalents.

What is claimed is:

1. A foldable display device, comprising:
a housing comprising a left housing and a right housing disposed opposite to each other;

a connecting member disposed between the left housing and the right housing, wherein the connecting member is rotationally connected to an end of the left housing and an end of the right housing;

a first support plate comprising a left first support plate and a right first support plate, wherein the connecting member is rotationally connected to an end of the left first support plate and an end of the right first support plate;

a second support plate comprising a left second support plate and a right second support plate, wherein an end of the left second support plate is rotationally connected to the left housing, another end of the left second support plate is slidingly and non-rotationally connected to the left first support plate, an end of the right second support plate is rotationally connected to the right housing, and another end of the right second support plate is slidingly and non-rotationally connected to the right first support plate; and a flexible display panel disposed on a surface formed by a connection of the housing, the connecting member, the first support plate, and the second support plate, wherein the flexible display panel comprises two first regions and a bendable region connected to the two first regions, the bendable region is separately disposed on a surface formed by a connection of the connecting member, the first support plate, and the second support plate, and the first regions are attached to the housing.

2. The foldable display device according to claim 1, wherein a surface of the connecting member near the flexible display panel is a flat surface, and the flat surface of the connecting member is configured to support the flexible display panel.

3. The foldable display device according to claim 2, wherein a surface of the connecting member away from the flexible display panel is an arc-shaped surface.

4. The foldable display device according to claim 1, wherein connection points of the left housing and the right housing with the connecting member are located in a middle region of a side surface of the connecting member.

5. The foldable display device according to claim 4, wherein connection points of the left first support plate and the right first support plate with the connecting member are located at two opposite ends of the side surface of the connecting member.

6. The foldable display device according to claim 1, wherein a connection type between the housing and the connecting member is a shaft/hole connection.

7. The foldable display device according to claim 6, wherein at a connection point of the housing and the connecting member, the housing is provided with a shaft, the connecting member is provided with a corresponding hole, and the shaft of the housing is mounted in the hole of the connecting member.

8. The foldable display device according to claim 6, wherein at a connection point of the housing and the connecting member, the housing is provided with a hole, the connecting member is provided with a corresponding shaft, and the shaft of the connecting member is mounted in the hole of the housing.

9. The foldable display device according to claim 1, wherein a connection type between the first support plate and the connecting member is a shaft/hole connection.

10. The foldable display device according to claim 9, wherein at a connection point of the first support plate and the connecting member, the first support plate is provided with a shaft, the connecting member is provided with a corresponding hole, and the shaft of the first support plate is mounted in the hole of the connecting member.

11. The foldable display device according to claim 9, wherein at a connection point of the first support plate and the connecting member, the first support plate is provided with a hole, the connecting member is provided with a corresponding shaft, and the shaft of the connecting member is mounted in the hole of the first support plate.

12. The foldable display device according to claim 1, wherein a connection type between the second support plate and the housing is a shaft/hole connection.

13. The foldable display device according to claim 12, wherein at a connection point of the second support plate and the housing, the second support plate is provided with a shaft, the housing is provided with a corresponding hole, and the shaft of the second support plate is mounted in the hole of the housing.

14. The foldable display device according to claim 12, wherein at a connection point of the second support plate and the housing, the second support plate is provided with a hole, the housing is provided with a corresponding shaft, and the shaft of the housing is mounted in the hole of the second support plate.

15. The foldable display device according to claim 1, wherein the first support plate is provided with a hook structure, the second support plate is mounted to the hook structure of the first support plate, and the first support plate is slidingly connected to the second support plate.

16. The foldable display device according to claim 1, wherein the second support plate is provided with a hook structure, the first support plate is mounted to the hook structure of the second support plate, and the first support plate is slidingly connected to the second support plate.

17. The foldable display device according to claim 1, wherein when the foldable display device is in a fully-expanded state, the housing, the connecting member, the first support plate, and the second support plate form a flat surface to support the flexible display panel, and a side of the connecting member away from the flexible display panel is located inside the housing.

18. The foldable display device according to claim 1, wherein when the foldable display device is in a fully-folded state, the connecting member, the first support plate, and the second support plate form a triangular accommodating region, and the bendable region of the flexible display panel is located in the triangular accommodating region.

19. The foldable display device according to claim 1, wherein the bendable region of the flexible display panel is a flexible region.

20. A foldable display device, comprising:

a housing comprising a left housing and a right housing disposed opposite to each other;

a connecting member disposed between the left housing and the right housing, wherein the connecting member is rotationally connected to an end of the left housing and an end of the right housing through a shaft and a hole;

a first support plate comprising a left first support plate and a right first support plate, wherein the connecting member is rotationally connected to an end of the left first support plate and an end of the right first support plate through a shaft and a hole;

a second support plate comprising a left second support plate and a right second support plate, wherein an end of the left second support plate is rotationally connected to the left housing through a shaft and a hole, another end of the left second support plate is slidingly and non-rotationally connected to the left first support plate, an end of the right second support plate is rotationally connected to the right housing through a shaft and a hole, and another end of the right second support plate is slidingly and non-rotationally connected to the right first support plate; and a flexible display panel disposed on a surface formed by a connection of the housing, the connecting member, the first support plate, and the second support plate, wherein the flexible display panel comprises two first regions and a bendable region connected to the two first regions, the bendable region is separately disposed on a surface formed by a connection of the connecting member, the first support plate, and the second support plate, and the first regions are attached to the housing.

* * * * *